US009191809B2

(12) United States Patent
Mahler et al.

(10) Patent No.: US 9,191,809 B2
(45) Date of Patent: Nov. 17, 2015

(54) WIRELESS NETWORK BROKERAGE

(71) Applicant: AT&T Mobility II LLC, Atlanta, GA (US)

(72) Inventors: Roger Newall Mahler, Marietta, GA (US); Mark J. Enzmann, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 120 days.

(21) Appl. No.: 14/037,058

(22) Filed: Sep. 25, 2013

(65) Prior Publication Data

US 2014/0023025 A1    Jan. 23, 2014

Related U.S. Application Data

(63) Continuation of application No. 11/113,031, filed on Apr. 25, 2005, now Pat. No. 8,570,989.

(51) Int. Cl.
*H04W 4/00*    (2009.01)
*H04W 8/24*    (2009.01)
*H04W 4/18*    (2009.01)

(52) U.S. Cl.
CPC ............ *H04W 8/245* (2013.01); *H04W 4/001* (2013.01); *H04W 4/18* (2013.01)

(58) Field of Classification Search
CPC ............................... H04W 84/12; H04W 84/18
USPC ................................ 370/338, 329; 455/432.1
See application file for complete search history.

(56) References Cited

U.S. PATENT DOCUMENTS

| | | |
|---|---|---|
| 6,469,998 B1 | 10/2002 | Burgaleta Salinas et al. |
| 2002/0075844 A1 | 6/2002 | Hagen |
| 2002/0077134 A1 | 6/2002 | Mizell et al. |
| 2002/0143968 A1 | 10/2002 | Banerjee et al. |
| 2002/0181422 A1 | 12/2002 | Parantainen et al. |
| 2003/0073449 A1 | 4/2003 | Motegi et al. |
| 2003/0187800 A1 | 10/2003 | Moore et al. |
| 2003/0235171 A1 | 12/2003 | Lundstrom et al. |
| 2004/0006601 A1 | 1/2004 | Bernstein et al. |
| 2005/0013289 A1* | 1/2005 | Tanimoto .................... 370/352 |

(Continued)

FOREIGN PATENT DOCUMENTS

WO    0223851 A2    3/2002

OTHER PUBLICATIONS

Office Action dated Oct. 15, 2012 for U.S. Appl. No. 11/113,031, 36 pages.

(Continued)

*Primary Examiner* — Chuck Huynh
(74) *Attorney, Agent, or Firm* — Amin, Turocy & Watson, LLP

(57) ABSTRACT

Propagation of a wireless signal is facilitated and brokered through a wireless network, and the signal is delivered by an appropriate method to an intended receiving wireless terminal. A single network element acts as a signal entry point and executes parallel processes to determine the location of an intended receiving wireless terminal and the registration thereof within the wireless network, the signal type, and the capabilities of the terminal. The network element then analyzes this information to determine the best method of signal propagation through the wireless network so as to ensure signal delivery to the wireless terminal or alternate delivery according to subscriber-set preferences.

20 Claims, 6 Drawing Sheets

(56) References Cited

U.S. PATENT DOCUMENTS

| | | | |
|---|---|---|---|
| 2005/0020234 A1* | 1/2005 | Iivari et al. | 455/403 |
| 2005/0026597 A1 | 2/2005 | Kim et al. | |
| 2005/0130659 A1 | 6/2005 | Grech et al. | |
| 2007/0291670 A1 | 12/2007 | Pettersson et al. | |

OTHER PUBLICATIONS

Office Action dated Dec. 14, 2011 for U.S. Appl. No. 11/113,031, 31 pages.

Office Action dated Mar. 23, 2011 for U.S. Appl. No. 11/113,031, 29 pages.

Office Action dated Jul. 15, 2010 for U.S. Appl. No. 11/113,031, 41 pages.

Office Action dated Mar. 31, 2010 for U.S. Appl. No. 11/113,031, 47 pages.

Office Action dated Dec. 1, 2009 for U.S. Appl. No. 11/113,031, 23 pages.

Office Action dated May 12, 2009 for U.S. Appl. No. 11/113,031, 18 pages.

Office Action dated Apr. 1, 2008 for U.S. Appl. No. 11/113,031, 15 pages.

Office Action dated Oct. 9, 2008 for U.S. Appl. No. 11/113,031, 20 pages.

\* cited by examiner

WIRELESS NETWORK BROKERAGE

CROSS-REFERENCE

This patent application is a continuation of U.S. patent application Ser. No. 11/113,031, filed on Apr. 25, 2005, entitled "WIRELESS NETWORK BROKERAGE METHOD AND SYSTEM", the entirety of which is incorporated by reference herein.

BACKGROUND

Demand for wireless multimedia services, such as messaging, data services, and Voice over Internet Protocol (VoIP) is steadily increasing. Many of these new services are transmitted via Internet Protocol (IP), as packetized digital data in the same manner as an Internet transmission. Not all wireless devices, however, may have the capability to accept an IP signal. When a wireless device has the capability, it must have an established IP context to communicate via IP, which is usually accomplished at the wireless terminal user's initiative.

Wireless communication over IP requires a Packet Data Protocol (PDP) context between the wireless terminal and the Serving Global Support Node (SGSN). Once the wireless terminal requests and initiates a PDP context with the SGSN, the SSGN requests an IP address from the Global Gateway Support Node (GGSN). The GGSN then assigns an IP address to the wireless terminal and registers that address. Due to the limited number of IP addresses that are assigned to each wireless provider and the very large number of wireless terminals in existence, each wireless terminal cannot have a permanent IP address.

A problem arises when an IP signal requires delivery to a wireless terminal, because a wireless terminal must request and obtain an IP address. The receiving terminal can not receive the signal without establishing an IP PDP context. It is desirable that wireless terminals have the ability to receive VoIP calls and other IP data transmissions from any number of applications under these circumstances.

Several messaging protocols currently operate on wireless networks and may not be compatible with each other. A signal sent by an application or wireless terminal using a different protocol than the receiving wireless terminal may encounter delivery problems. As a signal enters the network, it is routed through the architecture based on its signal and the wireless terminal to which it is to be delivered. Several layers of decision trees based on the above-stated parameters determine signal routing as a signal propagates through the network. The element or section of the network the signal is routed to may not have the capability to properly deliver the signal. If the signal is not deliverable at the end of a final decision tree, the signal may be dropped with no recourse for later or alternate delivery because no element of the network determines a resolution for such a problem.

One such messaging service that attempts to correct the problem is the IP Multimedia Service (IMS). IMS is based on the IP Multimedia Subsystem, a recent development of all-IP data services in next generation wireless networks. The IMS combines the IP Multimedia Subsystem protocols with several current messaging systems. IMS, however, is not a full solution because it suffers from the same signal and data delivery problems. If the network attempted signal delivery to a device that did not support IMS, it would follow the current network decision structures ending in delivery failure.

Another problem occurs when adding new functions and features to the network. Adding functions and capabilities to the system requires new hardware and layers of software. Much of the current network elements must be reprogrammed to recognize new functions and capabilities. Such steps add layers of processes and decision trees that further complicate signal routing.

An additional problem for wireless providers is billing for VoIP calls. It is possible to place a VoIP call by accessing an Internet Web site and only be charged for wireless Internet access, not for the standard voice call airtime.

DETAILED DESCRIPTION OF THE INVENTION

Figure 1A:
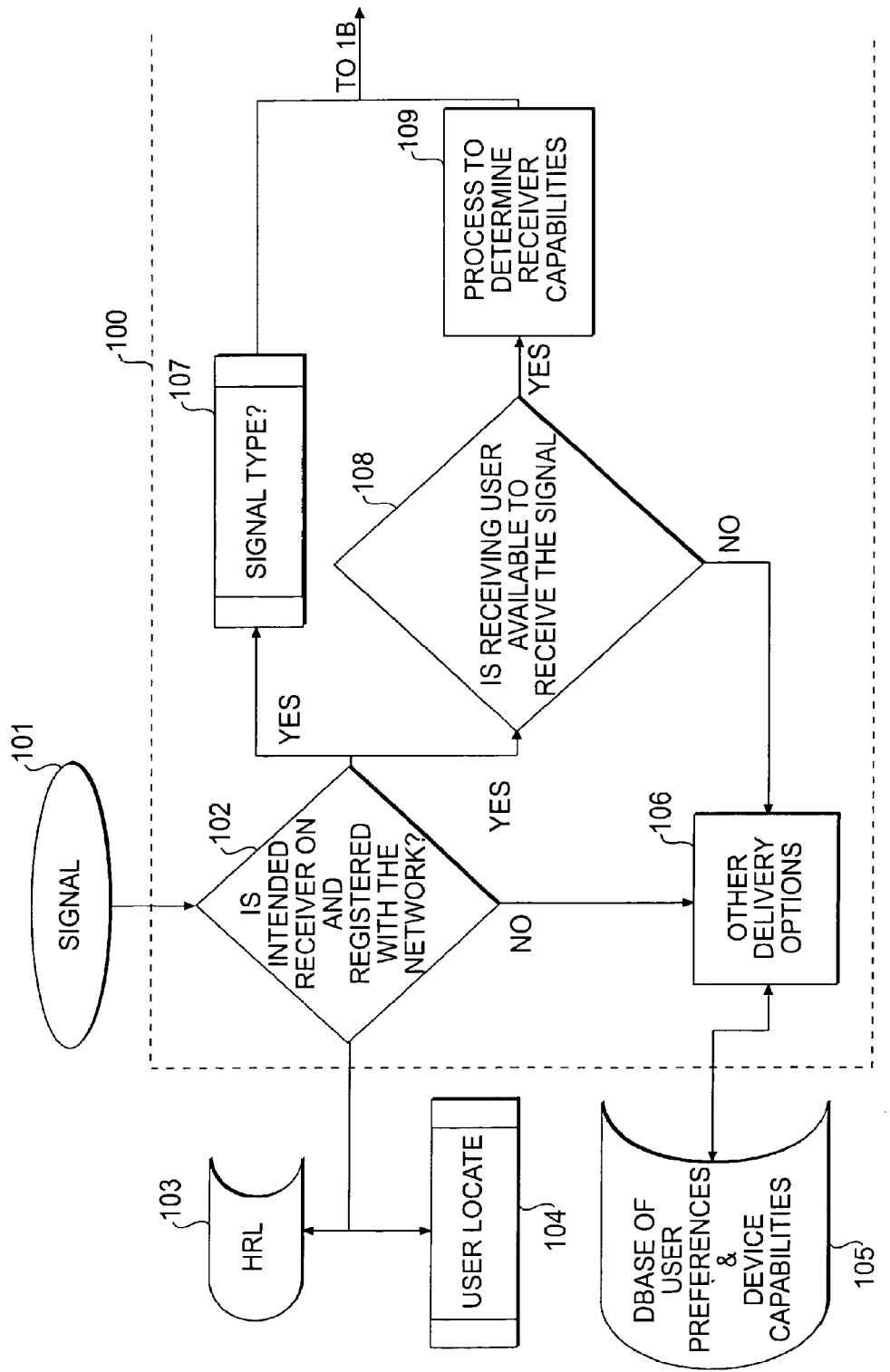
FIGS. 1A and 1B illustrate a method, in accordance with various embodiments.

Various embodiments disclosed herein provide for monitoring and interrogating multiple elements of a network to ensure successful signal delivery by following a set of routing rules fixed in a network element. For example, a signal propagates through the network as dictated by multiple sets of decision trees in response to variables such as signal type and delivery requirements. Further, various aspects disclosed herein enable a single network element to coordinate a number of varied network elements and provide a single entry point for signals, e.g., reducing the amount of reprogramming and hardware necessary to add new features, functions, and capabilities associated with signal delivery.

In an aspect, a method and a network element are provided which determine whether a receiving wireless terminal has an IP address and is able to receive IP transmissions when the signal first enters the network. When the terminal does not have an IP address, the method initiates a process that allows the network to prompt the wireless device to initiate an IP setup without the need for intervention by a user.

In another aspect, the method and network element recognize an incoming signal type and determine capabilities of an intended receiving wireless terminal. Further, in other aspects, the network element interrogates the wireless network to determine which network elements should be used in order to ensure delivery to the receiving wireless terminal. This results in a streamlined execution process and prevents dropped signals by re-routing a signal before the signal reaches the end of the decision tree or trees.

In other aspects, the network element is programmed with a knowledge of each of the network functions and is further programmed to reuse existing network capabilities, services, and resources when desirable. This eliminates the need for new layers of software to link old and new systems, and the unnecessary complexity resulting from this need, because only one network element needs to be reprogrammed.

According to other aspects, the method and network element can monitor activities of a user monitored as part of the overall brokering process so as to enable billing rates for usage, such as VoIP, to be applied. This feature addresses the situation wherein a user accesses the Internet and places a VoIP call without incurring airtime charges, thus causing the service provider to lose valuable revenue.

In accordance with one aspect, there is provided a method of facilitating delivery of a signal received by a wireless network to an intended receiving wireless terminal, the method comprising the steps of: (i) determining whether the intended receiving wireless terminal is operating on the wireless network; (ii) determining whether the intended receiving wireless terminal is available to receive said signal; (iii) determining a signal type for said signal; (iv) determining whether the intended receiving wireless terminal is capable of receiving a signal of said signal type; (v) determining, prior to further propagation of the signal to the wireless network, an appropriate delivery method based on the determinations of steps (i)-(iv) so as to assure that said signal will be successfully delivered to said intended receiving wireless terminal; (vi) propagating said signal to the network; and (vii) transmitting said signal to the intended receiving wireless terminal using the delivery method determined in step (v).

In one aspect, the step of determining whether said intended receiving wireless terminal is operating on the wireless network comprises interrogating at least one element of the wireless network so as to locate the intended receiving wireless terminal.

In another aspect, the method further comprises determining whether said intended receiving wireless terminal is registered on the wireless network and using the result in step (v).

In yet another aspect, the step of determining whether said intended receiving wireless terminal is available to receive said signal comprises evaluating the current activity status of said intended receiving wireless terminal.

Advantageously, the method further comprises searching a database of network user preferences and using the result in step (v).

In one aspect, the step of determining whether the intended receiving wireless terminal is capable of receiving said signal type comprises interrogating a database of network wireless terminal capabilities.

In another aspect, a method is provided for facilitating delivery of a signal received by a wireless network to an intended receiving wireless terminal, the method comprising the steps of: (i) determining whether the intended receiving wireless terminal is operating on the wireless network; (ii) determining whether the intended receiving wireless terminal is available to receive said signal; (iii) determining a signal type for said signal; (iv) determining whether the intended receiving wireless terminal is capable of receiving a signal of said signal type; (v) determining, prior to further propagation of the signal to the network, an appropriate delivery method based on the determinations of steps (i)-(iv) so as to assure that said signal will be successfully delivered to said intended receiving wireless terminal; (vi) propagating said signal to the network; and (vii) transmitting said signal to the intended receiving wireless terminal using the delivery method determined in step (v).

In yet another aspect, the method further comprises, as part of steps (v) to (vii), the further steps of determining whether said intended receiving wireless terminal is capable of receiving a signal transmitted by Internet protocol; and instructing said wireless network to initiate an automatic Internet protocol setup between the network and the intended receiving wireless terminal using a packet data protocol context, and transmitting said signal to said terminal using Internet protocol as the appropriate delivery method.

In one aspect, the step of determining whether said intended receiving wireless terminal is operating on said wireless network comprises interrogating at least one other element of said wireless network to locate said intended receiving wireless terminal.

In another aspect, the method further comprises determining whether said intended receiving wireless terminal is registered on said wireless network and using the result in step (v).

In yet another aspect, the step of determining whether said intended receiving wireless terminal is available to receive a signal of said signal type comprises evaluating the current activity status of said intended receiving wireless terminal.

In one aspect, the method further comprises searching a database of network user preferences and using the result in step (v).

In another aspect, the step of determining whether said intended receiving wireless terminal is capable of receiving a signal of said signal type comprises interrogating a database of network wireless terminal capabilities.

Advantageously, the method further comprises locating said intended receiving wireless terminal by interrogating at least one other element of said wireless network.

Further, in an aspect, the method comprises receiving and processing network signal inputs intended for devices operating on said wireless network from outside said wireless network.

In one aspect, the step of determining whether said intended receiving wireless terminal is capable of receiving a signal transmitted by Internet protocol comprises interrogating a network database of wireless terminal capabilities.

In another aspect, the method further comprises: initiating a page from said wireless network to said intended receiving wireless terminal over a control channel requesting that said intended receiving wireless terminal obtain a temporary Internet protocol address; assigning a temporary Internet protocol address to said intended receiving wireless terminal in response to a request from said intended receiving wireless terminal initiated in response to said page; and establishing data communication with said intended receiving wireless terminal based on said temporary Internet protocol address.

The page preferably comprises a standard Internet command. Preferably, the temporary Internet protocol address is communicated to the wireless terminal. Advantageously, the request from said intended receiving wireless terminal is initially received by a Serving Gateway Support Node (SGSN) of the network which establishes said packet data protocol context. Preferably, the packet network protocol context is established, a Global Gateway Support Node (GGSN) assigns said Internet protocol address to said intended receiving wireless terminal and registers said address. Preferably, said further steps further comprise instructing a Mobile Switching Center of said wireless network to establish an Internet protocol communication with said intended receiving wireless terminal.

In accordance with yet another aspect, there is provided a wireless network entry point system for facilitating delivery of an incoming wireless signal by a wireless network to an intended wireless receiving terminal, said system comprising an entry point processor for analyzing the incoming signal, interrogating at least one element of a wireless network to determine the capabilities of the intended receiving wireless terminal with respect to receiving the incoming signal, for determining an appropriate method of delivery of the incoming signal based on the analyzing and interrogating steps, and for delivering said incoming signal using said appropriate method of delivery by converting, if necessary, said incoming signal into a deliverable signal compatible with the capabilities of the receiving terminal.

In an aspect, the entry point processor interrogates a network database of user preferences for alternate delivery whereby a failed delivery attempt is rerouted according to said use preferences.

In another aspect, the entry point processor interrogates a network database to determine location information regarding the intended receiving wireless terminal.

In yet another aspect, the entry point processor comprises a digital data processor.

In one aspect, the at least one element comprises a digital data processor and a digital memory data storage unit for storing said wireless terminal user preferences.

Preferably, the at least one element comprises an HLR for providing said location information.

Advantageously, the system further comprises a digital data storage unit for storing said wireless terminal capabilities of said intended receiving wireless terminal.

According to a further aspect of the invention, there is provided a computer readable medium having stored thereon at least one sequence of instructions for causing at least one processor to perform a method for facilitating delivery of a signal received by a wireless network to an intended receiving wireless device, said method comprising the steps of: (i) determining whether the intended receiving wireless terminal is operating on the wireless network; (ii) determining whether the intended receiving wireless terminal is available to receive said signal; (iii) determining a signal type for said signal; (iv) determining whether the intended receiving wireless terminal is capable of receiving a signal of said signal type; (v) determining, prior to further propagation of the signal to the network, an appropriate delivery method based on the determinations of steps (i)-(iv) so as to assure that said signal will be successfully delivered to said intended receiving wireless terminal; (vi) propagating said signal to the network; and (vii) transmitting said signal to the intended receiving wireless terminal using the delivery method determined in step (v).

In an aspect, the step of determining whether said intended receiving wireless terminal is operating on the wireless network comprises interrogating at least one element of said wireless network to locate the intended receiving wireless terminal.

In one aspect, the method further comprises determining whether said intended receiving wireless terminal is registered on the wireless network and using the result in step (v).

In another aspect, the step of determining whether said intended receiving wireless terminal is available to receive said signal comprises evaluating the current activity status of said intended receiving wireless terminal.

In yet another aspect, the method further comprises searching a database of network user preferences and using the result in step (v).

In an aspect, the step of determining whether the intended receiving wireless terminal is capable of receiving said signal type comprises interrogating a database of network wireless terminal capabilities.

Various aspects disclosed herein can serve various multi-technology wireless devices providing voice, data, and any other content. The technologies employed can use either digital or a combination of digital-analog technology and methods. In various embodiments of methods disclosed herein, such methods can utilize GSM and TDMA wireless network protocols. Further, the term wireless terminal as used herein means all user devices that are (i) capable of wireless communication of any type of information content using any transmission method, standard, or protocol, and (ii) capable of communicating with, and receiving commands or instructions from, the network.

Figure 1B:
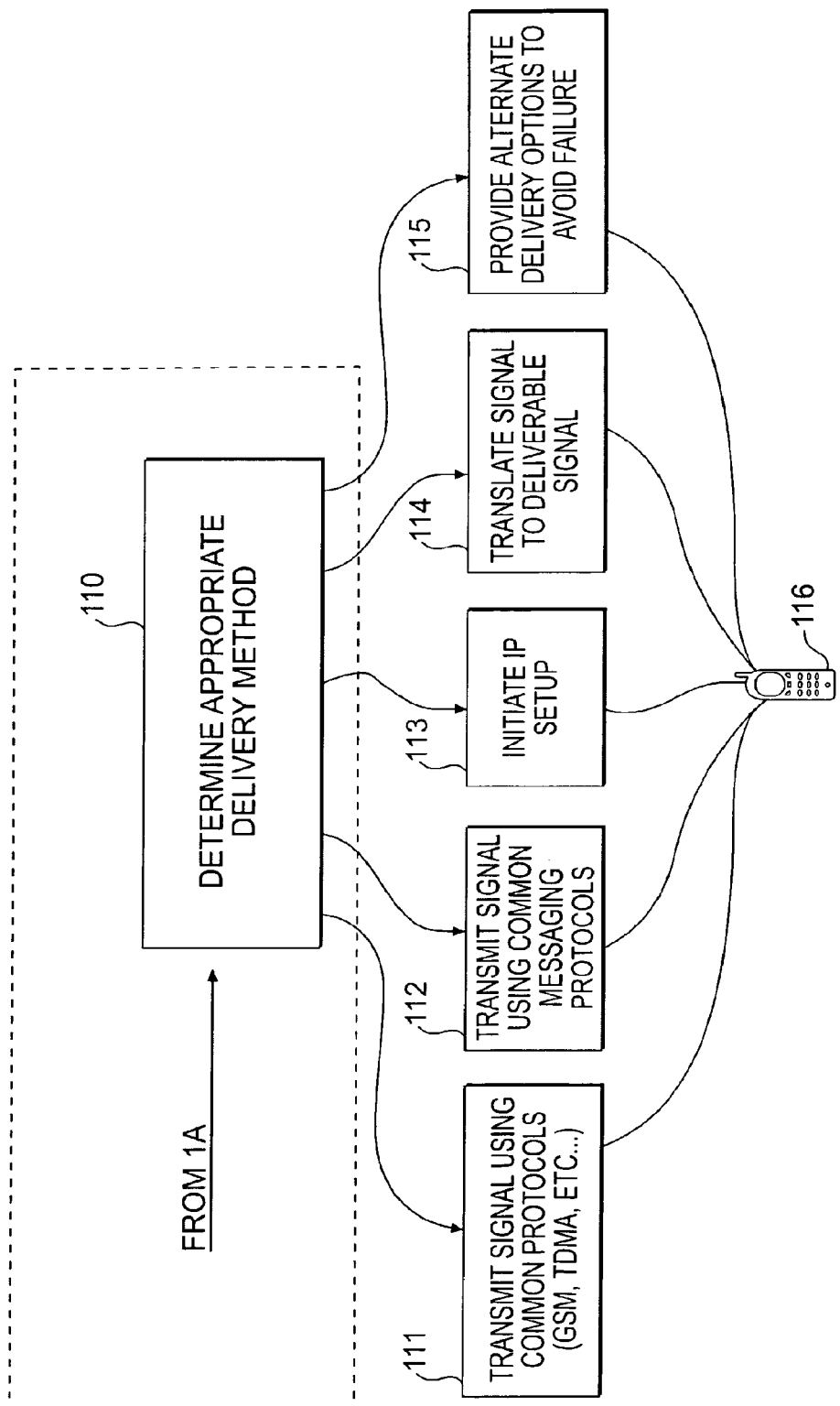

Referring to the drawings, FIGS. 1A and 1B illustrate a method, in accordance with various embodiments described herein. All of the key decisions made by the method are incorporated in a "broker" network element or broker, indicated at 100. Referring to FIG. 1A, a signal 101 originates from outside of the wireless network and enters the network through the broker 100. As indicated by decision diamond 102, the method then determines whether or not the intended receiving wireless terminal is operating on, and registered with, the network. The broker 100 interrogates the home location registry (HLR) database 103 to determine if the intended receiving wireless terminal is registered on the network, and initiates a network locator process, indicated by block 104, to determine whether and where the intended receiving wireless terminal is operating on the network. If the receiving terminal is not operating on the network, the broker 100 will initiate a process, as indicated by block 106, to determine the user's alternate signal delivery preferences, such as a voice-mail box, message inbox, email inbox, or sending of a non-delivery message to the sender, by interrogating a network database 105 of user preferences and deliver the signal in the appropriate alternate manner.

If the broker 100 determines that the intended recipient subscriber is operating on the network, i.e., if a "Yes" output is produced by decision diamond 102, the broker 100 begins several parallel processes. In one of these processes, as indicated by process block 107, the broker 100 determines the incoming signal type using conventional prior art processes. In another process, as indicated by decision diamond 108, the broker 100 also determines whether or not the recipient terminal is available to receive the signal at that time. If not, i.e., if the answer is "No," the broker 100 determines alternative delivery options, as illustrated by block 106, by accessing the network database 105 of user preferences and, if there are other delivery options, one or more of these options may be pursued, as described above. If, on the other hand, the recipient subscriber terminal is available to receive the signal, the broker then determines the capabilities of the intended receiving wireless terminal to receive and transmit certain signal types, as indicated by process block 109. If this information is not available, database 105 is interrogated as to the capabilities of the receiving terminal.

Referring now to FIG. 1B, the broker 100 next processes the information regarding the signal type and receiving wireless terminal capabilities and analyzes this information to determine the appropriate delivery method, as indicated by block 110. This involves determining the necessary signal translations or other actions necessary for successful delivery of the signal to the receiving wireless device. Further, as this process incorporates examining existing network functions, the broker 100 determines which network element or process will ensure successful delivery.

Once this analysis is accomplished, the broker 100 initiates one of a number of existing network options. The first two options, indicated at 111 and 112, concern delivery by a common voice protocol and delivery messaging protocol, respectively. Delivery options 111 and 112 provide for direct delivery of an incoming signal to the intended receiving wireless terminal 116 having the necessary capabilities. Option 113 concerns a network-initiated process whereby the intended receiving wireless terminal 116 obtains an IP address, and is discussed in more detail below. Option 114 concerns a prior art, current network process for translating an incoming signal type to one that the intended receiving wireless terminal 116 is capable of receiving, so as to ensure proper delivery. Option 115 concerns other user-defined delivery options if the signal is not able to be delivered to the intended receiving wireless terminal 116.

When the desired delivery option is chosen, the wireless network then delivers the signal to an intended receiving wireless terminal 116 by using that option. The broker 100 will monitor the entire process and redirect a signal if necessary to prevent a dropped or undelivered signal.

Figure 2:
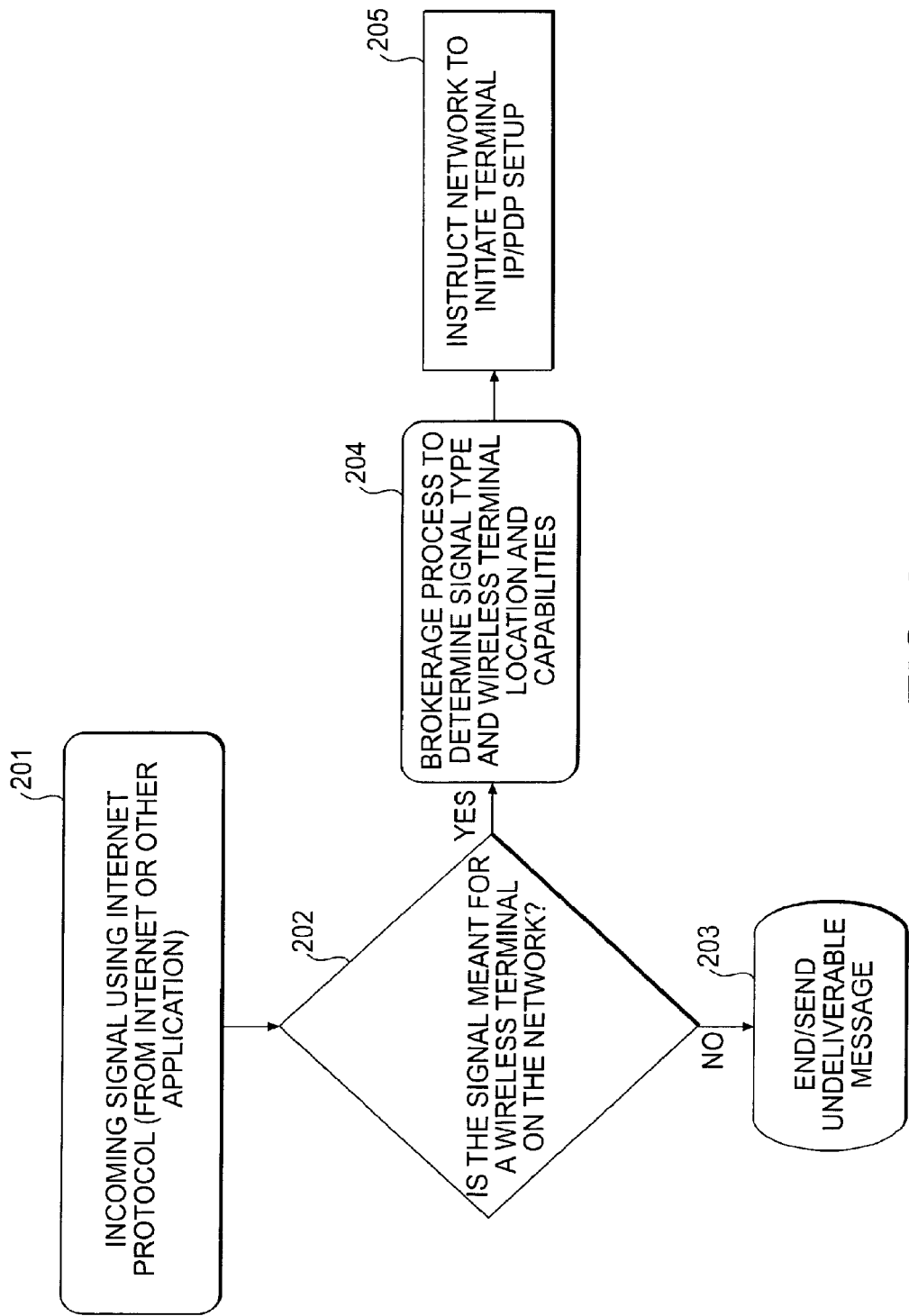
FIG. 2 is a flow chart illustrating activation of a network-initiated automated IP/PDP context setup, in accordance with various embodiments.

FIG. 2 is a flow chart illustrating activation of a network-initiated automated IP/PDP context setup as described above in connection with Option 113 of FIG. 1A, in accordance with various embodiments described herein. Such a process, which is discussed in more detail below, is disclosed in co-pending application Ser. No. 10/980,306, entitled NETWORK INITIATED METHOD AND SYSTEM FOR ESTABLISHING DATA COMMUNICATION USING IP WITH A WIRELESS TERMINAL, filed Nov. 4, 2004, the disclosure of which is hereby incorporated by reference. Referring to FIG. 2, as indicated by block 201, the process begins when a signal using Internet protocol format and intended for a receiving wireless terminal operating on the wireless network enters the network. As denoted by block 202, the next step in the process is to determine whether the signal is meant for a wireless terminal that is operating on the network. If it is determined that the intended receiving wireless terminal is not on the network, then the process ends and the broker 100 delivers a message, as indicated by block 203, to the/sender that the user was unavailable or that message delivery was delayed. If it is determined that the intended receiving wireless terminal is operating on the network, the abovementioned parallel processes of the broker method are activated to determine the signal type, the location of the intended receiving wireless terminal 116, and wireless terminal capabilities, as indicated by block 204. Once this is accomplished, as in one preferred embodiment, the network is instructed by the broker to initiate the automated IP/PDP context setup process for the intended receiving wireless terminal, as indicated by block 205.

Figure 3:
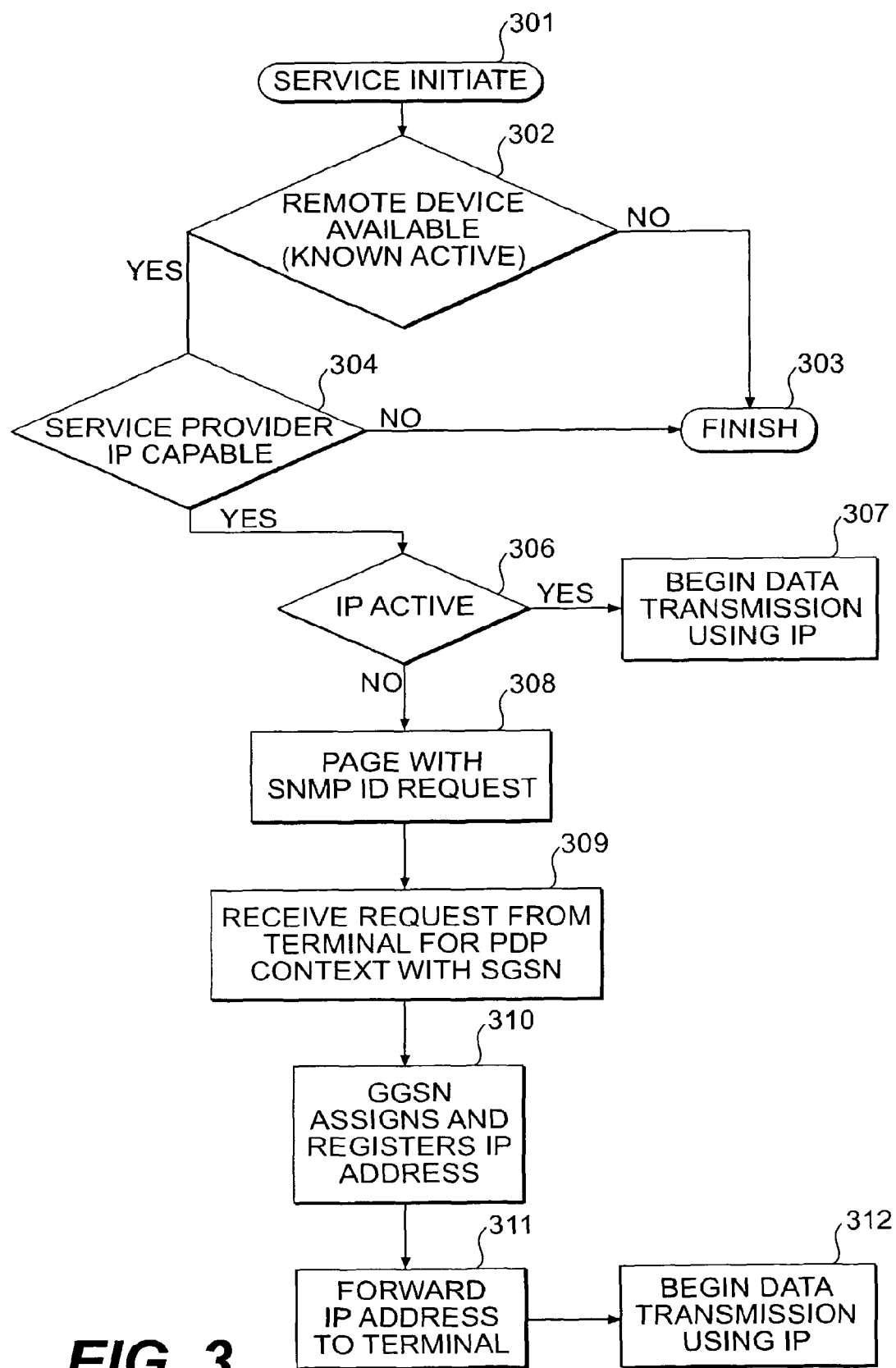
FIG. 3 is a flow chart of a network-initiated IP/PDP context setup used in the method of FIG. 2, in accordance with various embodiments.

FIG. 3 is a detailed flow chart of the network-initiated IP address setup described in copending application Ser. No. 10/980,306, incorporated by reference above. As indicated above, in one preferred embodiment of the invention this network-initiated IP address setup is employed. Referring to FIG. 3, in order to begin a VoIP session or, more generally, transmit data to a receiving wireless terminal using an IP context, a sending wireless terminal or other application seeking to establish an IP communication with the intended receiving wireless terminal, may, as indicated by block 301, initiate the session by initiating a call or sending a message to the wireless network providing service to the intended receiving wireless terminal. As indicated by decision diamond 302 the serving wireless network, using conventional prior art processes and protocols, locates the intended receiving wireless terminal and determines whether the terminal is active, i.e., available for communication.

As illustrated by block 303, if the system is not able to locate the receiving terminal or the receiving wireless terminal is not available for communication, i.e., the decision is "NO," the system terminates the communications session as illustrated by block 303, and may or may not notify the sending wireless terminal.

If the remote wireless terminal is available, i.e., the decision is "YES," the system next determines whether the receiving terminal and its service provider are IP capable. This is illustrated by decision diamond 304 and if the answer is "NO," the session is again terminated as indicated by the connection to "Finish" block 303. Again, the system may or may not notify the sending wireless terminal.

If the service provider is IP capable, i.e., the decision is "YES," the network determines whether the receiving wireless terminal is IP active and, therefore, has already been assigned an IP address. This is illustrated by decision diamond 306. If the answer is "YES" the system begins transmission of data or voice over IP using standard IP communications between the initiating terminal or application and the receiving wireless terminal using their respective IP addressees and the digital transmission of data over traffic channels to the receiving wireless terminal at its assigned IP address. This is illustrated by block 307.

Up to this point, the method described is essentially conventional. As discussed above, a serious problem arises when the receiving wireless terminal does not have an IP address. This is, of course, represented by the "NO" branch of decision diamond 306. As illustrated by block 308, if the receiving wireless terminal does not have an active IP address, the network will then page the terminal over the control channel and, more particularly, will send a "request for 10" page. In a preferred embodiment, the page used is a standard instruction in the internet Standard Network Management Protocol (SNMP). The transmitted packet itself contains the instructions for the page request and may be constructed in many different ways.

In response to such a page, the receiving wireless terminal will request an IP address so as to establish a PDP context with the serving gateway support node (SGSN) of the network. As indicated by block 309 this request is received by the network and the SGSN will then request an IP address from the global gateway support node (GGSN). In response, the GGSN will assign and register an IP address for the receiving wireless terminal, as is represented by block 310. This address is also forwarded to the wireless terminal (see block 311). It will be understood that once the receiving terminal has been assigned an IP address by the GGSN, transmission of data or voice over IP using standard IP communications can take place between the initiating terminal or application and the receiving wireless terminal using their respective IP addresses, as can digital transmission of data over traffic channels to the receiving wireless terminal at its assigned IP address.

Figure 4:
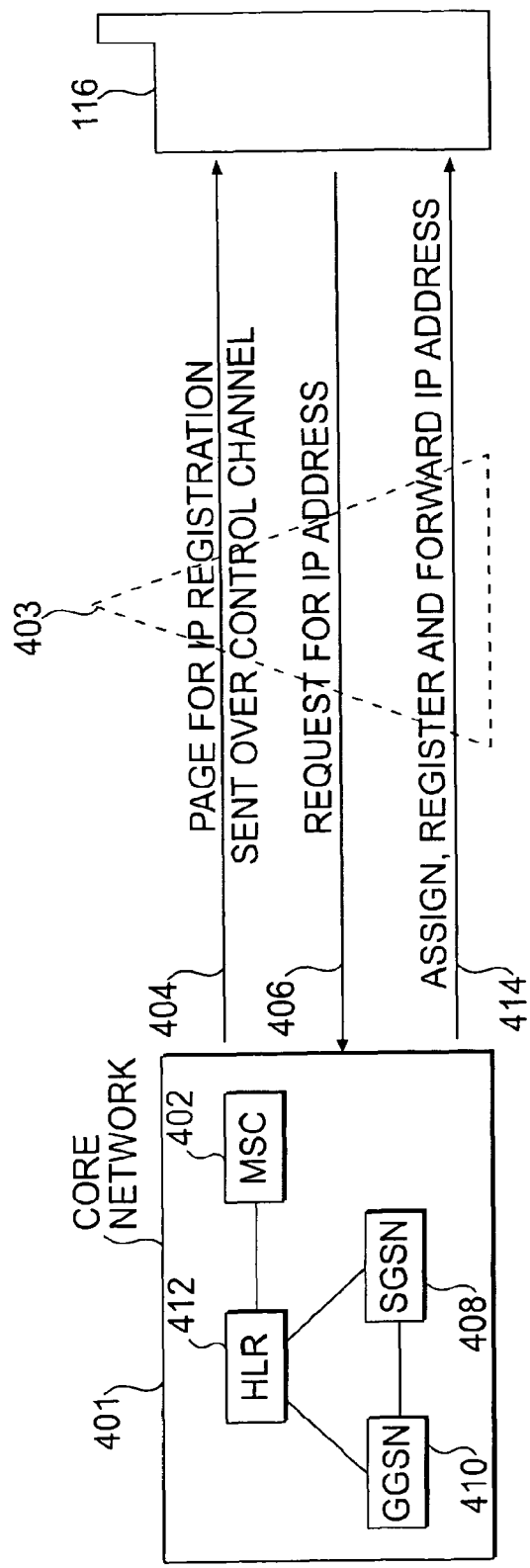
FIG. 4 is schematic diagram illustrating a network initiated IP/PDP context setup process, in accordance with various embodiments.

FIG. 4 is a highly schematic representation of a system of the type associated with a network-initiated IP setup method and process of FIG. 3, in accordance with various embodiments. In general, the system, which includes a core network 401, enables an intended receiving wireless terminal, denoted 116, to automatically obtain an IP address at the direction of the wireless network. The overall wireless system can, of course, include a communication tower or towers indicated in dashed lines at 403. In order to establish data communications using IP between the intended receiving wireless terminal 116 when terminal 116 does not have an IP address, an MSC 402 of the core network 401 sends to terminal 116 a page, i.e., a command or instruction, to request an IP address, as illustrated by arrow 404. The page causes terminal 116 to transmit a request for an IP address, as indicated at 406, i.e., to request a PDP context from a SGSN 408 of the core network 401. The SGSN 408 is coupled to a GGSN 410 of the core network 401.

Continuing to refer to FIG. 4, an HLR 412 is interconnected with the SGSN 408, GGSN 410, and the MSC 402. The HLR 412 functions in the address registration process by first interrogating other components (i.e., the GGSN 410) to determine whether or not the intended receiving wireless terminal 116 has an IP address. If so, the HLR 412 will then establish the link through the GGSN 410 and SGSN 408 and the transmission thereafter progresses. However, if the intended receiving wireless terminal 116 does not have an IP address, the terminal 116 will follow the normal process of contacting the SGSN 408 and GGSN 410 for an address and ultimately returning that address to the HLR 412.

Considering this address registration process in more detail, when terminal 116 transmits a request for a PDP context from the SGSN 408, SGSN 408 then establishes a PDP context with the intended receiving wireless terminal 116 and signals the GGSN 410 which, as indicated by arrow 414, assigns the wireless terminal 116 a temporary, dynamic IP address, registers the address with the IP computer network and forwards the address to the terminal 116. In this way, the intended receiving wireless terminal 116 is thus provided with an IP identifier to be used to identify the terminal on the IP computer network for IP communications. As indicated above, the HLR 412 is also updated with this information.

The broker 100 of FIG. 1 interacts with the system of FIG. 4 by monitoring the GGSN 410 for the IP address of the sending terminal. The broker 100 also recognizes that the intended receiving wireless terminal requires an IP address to complete the session and prompts the network-initiated wireless terminal IP setup. As that process is underway, the broker monitors GGSN 410 to determine when the intended receiving wireless terminal 116 obtains and registers an IP address and is therefore able to receive an IP format signal. The broker will then allow the connection between the sending and receiving terminals.

Figure 5:
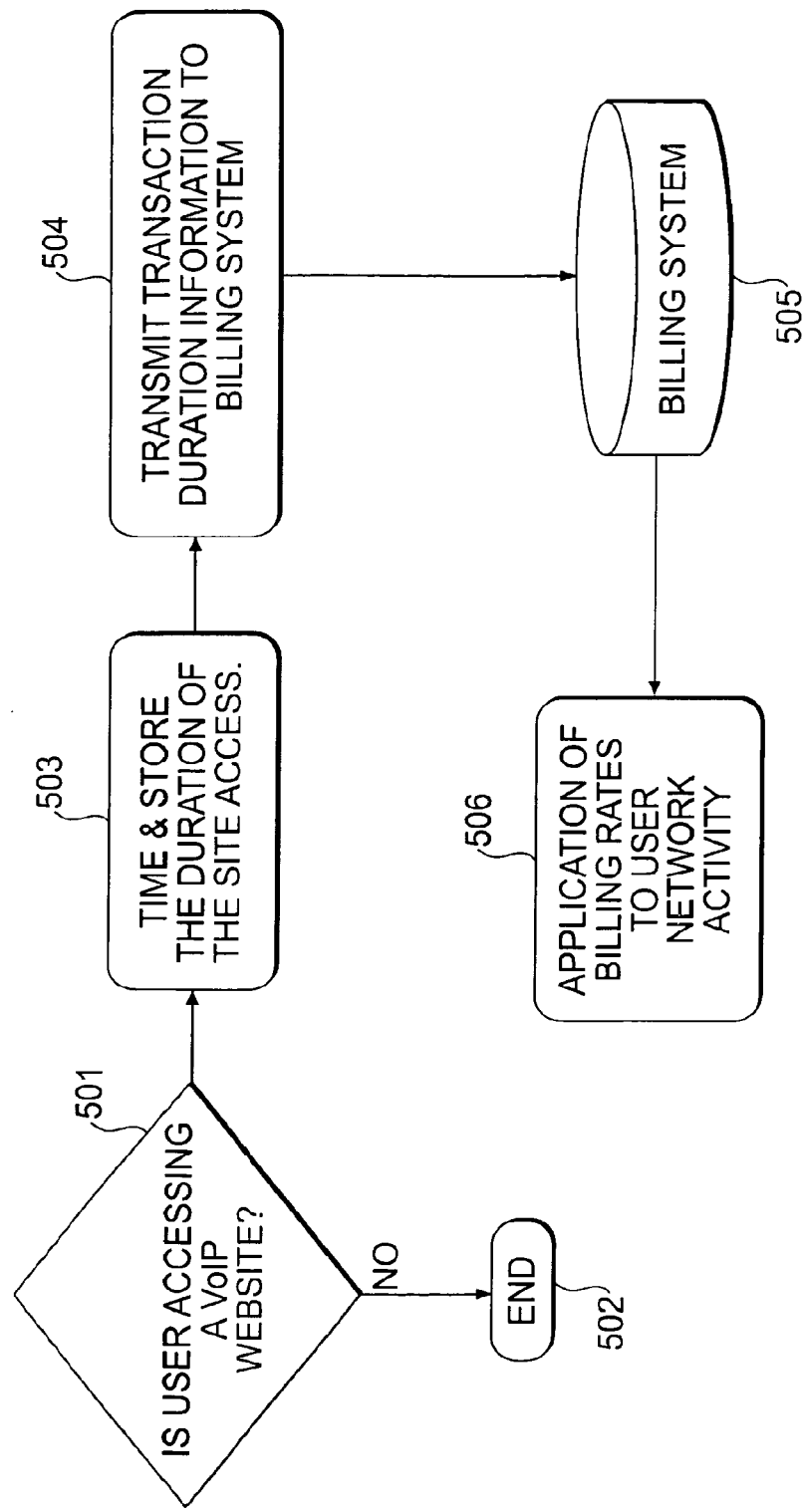
FIG. 5 is a flow chart illustrating interaction with a service provider billing system, in accordance with various embodiments.

FIG. 5 is a flow chart illustrating interaction with a service provider billing system, in accordance with various embodiments described herein. In one embodiment, the broker interacts with the billing system of the service provider to properly bill for VoIP calls. As will be apparent, such interaction by the service provider with a billing system may be appropriate for other wireless data transactions and for various other network systems. As shown by decision diamond 501, the method illustrated in FIG. 5 first determines whether the wireless terminal user is accessing a VoIP Web site and placing a VoIP call. Of course, if there is no access to a VoIP Web site, the process then ends, as indicated by block 502. If there is accessing, i.e., if the answer is "Yes," the duration of the access by the wireless terminal to the VoIP site is measured and the length of the VoIP session is stored, as indicated by block 503. As indicated by block 504, the duration of the session is then transmitted to a billing system 505 of the wireless network. The billing system 505 will process the duration information as further usage of the network by the wireless terminal. Finally, the billing system will apply the usage time to the subscriber's billing plan, as indicated by block 506.

The broker method and system described above provide a platform for a wide range of wireless network applications and features. VoIP and billing applications have been discussed above. However, many other applications are contemplated, all with less bandwidth usage. In this regard, an incoming signal need not originate from another wireless terminal or a land-line user, i.e., in some embodiments, such a signal is provided by a software application to transmit software updates for a wireless terminal as well as news, weather, sports, and similar updates. In preferred embodiments, such updates are accomplished automatically by the network, in the case of, e.g., software updates, or at the behest and prompting of the user, in the case of, e.g., news updates. The broker method and system also enable the user to download other new software and applications to a wireless terminal while scheduling the download to take place at a convenient time (e.g., at night) when the terminal is not in use. Further, as indicated above, the broker method and system enables such applications with less bandwidth usage and greater network efficiency.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to receiving a voice over Internet protocol communication comprising a message content directed to a wireless device, determining, by a system comprising a processor, whether an Internet protocol address has been assigned to the wireless device;
in response to the Internet protocol address being determined not to have been assigned to the wireless device, and in response to determining that the wireless device is capable of receiving the voice over Internet protocol communication, sending, by the system via a wireless control channel, an instruction directed to the wireless device for initiating the wireless device to send, to the system, a request for a temporary Internet protocol address;
in response to the sending of the instruction, receiving, by the system, the request for the temporary Internet protocol address from the wireless device;
sending, by the system, a data packet associated with the voice over Internet protocol communication directed to the wireless device, wherein the data packet comprises the temporary Internet protocol address; and
in response to the sending of the data packet, monitoring and redirecting, by the system, the voice over Internet protocol communication to the wireless device using an alternative delivery option to facilitate delivery of the message content.

2. The method of claim 1, wherein the sending of the instruction comprises paging the wireless device via a network management protocol.

3. The method of claim 1, wherein the sending of the instruction comprises querying a wireless network device to locate the wireless device.

4. The method of claim 1, further comprising:
determining, by the system, whether the wireless device has been registered for operation on a service provider device of a wireless network.

5. The method of claim 1, wherein the determining whether the Internet protocol address has been assigned to the wireless device comprises:
in response to determining that the wireless device is capable of receiving the voice over Internet protocol communication, determining whether the Internet protocol address has been assigned to the wireless device.

6. The method of claim 1, further comprising:
determining, by the system, whether the wireless device is capable of receiving the voice over Internet protocol communication.

7. The method of claim 6, wherein the determining whether the wireless device is capable of receiving the voice over Internet protocol communication comprises
querying a data storage device storing network wireless terminal capabilities.

8. A computer-readable storage device comprising executable instructions that, in response to execution, cause a system comprising a processor to perform operations, comprising:
receiving an Internet protocol-based communication comprising a message content associated with a call directed to a network device of a wireless system;
verifying that the network device is not associated with an Internet protocol address;
in response to the verifying, and in response to determining that the network device is capable of receiving the Internet protocol-based communication, sending, via a wireless control channel, a page directed to the network device instructing the network device to send a request for a temporary Internet protocol address to the system;
receiving the request for the temporary Internet protocol address from the network device based on the page;
sending a communication associated with the call to the network device, wherein the communication comprises the temporary Internet protocol address; and
in response to the sending of the communication, monitoring and redirecting the Internet protocol-based communication to the network device using an alternative delivery option to facilitate delivery of the message content.

9. The computer-readable storage device of claim 8, wherein the verifying that the network device is not associated with the Internet protocol address comprises:
in response to determining that the network device is capable of receiving the Internet protocol-based communication, verifying that the network device is not associated with the Internet protocol address.

10. The computer-readable storage device of claim 9, wherein the determining that the network device is capable of receiving the Internet protocol-based communication comprises determining whether the network device is registered to operate via a service provider device of a wireless network.

11. The computer-readable storage device of claim 9, wherein the determining that the network device is capable of receiving the Internet protocol-based communication comprises evaluating a current activity status of the network device.

12. The computer-readable storage device of claim 9, wherein the determining that the network device is capable of receiving the Internet protocol-based communication comprises searching network user preferences stored in a data storage device.

13. The computer-readable storage device of claim 9, wherein the determining that the network device is capable of receiving the Internet protocol-based communication comprises interrogating a data storage device storing network wireless terminal capabilities.

14. The computer-readable storage device of claim 8, wherein the operations further comprise:
assigning the temporary Internet protocol address to the network device based on the request.

15. The computer-readable storage device of claim 14, wherein the assigning comprises assigning, via a global gateway support node device, the temporary Internet protocol address to the network device.

16. The computer-readable storage device of claim 8, wherein the receiving the request comprises receiving the request via a serving gateway support device of a wireless network.

17. The computer-readable storage device of claim 16, wherein the operations further comprise:
instructing a mobile switching center device of the wireless network to establish the communication with the network device.

18. A system, comprising:
a processor; and
a memory that stores executable instructions that, when executed by the processor, facilitate performance of operations, comprising:
receiving a voice over Internet protocol communication comprising a message content directed to a wireless device;
in response to determining that the wireless device is not associated with an active Internet protocol address, and in response to determining that the wireless device is capable of receiving the voice over Internet protocol communication, sending, via a wireless control channel, a page directed to the wireless device comprising an instruction directing the wireless device to request a temporary Internet protocol address from the system;
in response to receiving, based on the page, a communication comprising the request for the temporary Internet protocol address from the wireless device, sending an Internet protocol based communication comprising the temporary Internet protocol address directed to the wireless device;
in response to the sending of the Internet protocol based communication, monitoring and redirecting the voice over Internet protocol communication to the wireless device using an alternative delivery option to facilitate delivery of the message content.

19. The system of claim 18, wherein the operations further comprise:
determining whether the Internet protocol based communication is associated with a voice over Internet protocol call; and
measuring a duration of the voice over Internet protocol call.

20. The system of claim 18, wherein the receiving of the communication comprises receiving the communication using a serving gateway service node device.

* * * * *